Sept. 9, 1958  N. L. HUFFAKER  2,851,306
SOAKER HOSE
Filed Nov. 7, 1957
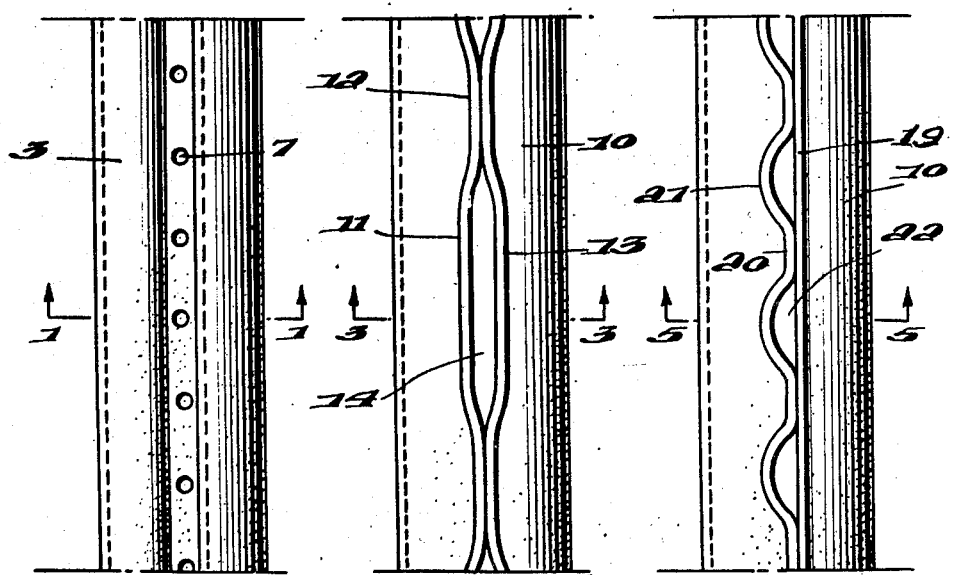
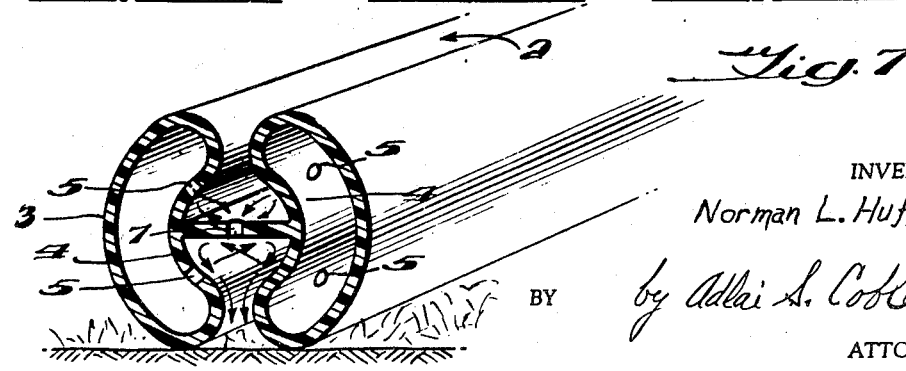
INVENTOR
Norman L. Huffaker
BY
ATTORNEY

2,851,306
SOAKER HOSE
Norman L. Huffaker, Richmond, Va.
Application November 7, 1957, Serial No. 694,944
10 Claims. (Cl. 299—104)

This invention relates to a soil soaking device, and more particularly, it relates to a soaker device comprising a plurality of interconnected, perforated, hose elements made of plastic material, for watering lawns, shrubs, gardens, or the like.

Heretofore, soaker hoses made of canvas material have been in common use, but such hoses have not lasted long, since the canvas material, when left out of doors, soon rots and disintegrates. Then, too, the canvas soaker hose, when laid on uneven ground, and/or curved around a bend, will kink or crease, causing water to emerge out of the fore part of the hose comparatively rapidly, while the water supply in the remainder of the hose is restricted, so that the contiguous soil is not adequately watered by such remaining soaker portion.

To overcome the disadvantages of the canvas soaker hose, manufacturers have supplied plastic hose, with small through holes in the top wall portion, so that water will issue in sprays out of said holes. Such plastic hose may be used as a soaker hose by turning the hose upside down, with the holes contiguous to the underlying ground. However, a plastic hose, when so used as a soaker and curved around a bend, will twist, causing the perforated hose area to elevate at one side, and the water to spray out laterally of the hose. This has sometimes led to the use of bricks, or the like, on the ground to check and confine such lateral sprays.

The principal object of my invention is to have perfect control of the soaking of the desired ground area. This is accomplished by forming a hose with adjacent spaced portions having holes therein directed inwardly toward adjacent hose portions, so that the sprays of water will impinge onto such adjacent hose portions and trickle gently down to the ground, no matter how the hose is bent and twisted.

An additional object is to provide a soaker hose made of flexible, plastic material that will not kink or crease on uneven ground and/or around a bend and cause an uneven soaking operation.

A further object of my invention is to provide a hose device that will not rot and/or disintegrate when lying on the ground for any substantial length of time.

A still further object of my invention is the use of a plurality of hose elements in my device to increase the soaked ground area in a given time.

Another object of my invention is to stagger the holes in the adjacent hose elements to improve the blocking action and more completely confine the soaking to the ground area desired.

The above and other objects of the present invention will become apparent from the detailed description of my device, illustrated in the accompanying drawings, in which:

Fig. 1 is a transverse cross sectional view of one embodiment of my soaker device along the line 1—1 in Fig. 2;

Fig. 2 is a fragmentary plan view of the embodiment of Fig. 1;

Fig. 3 is a transverse cross sectional view of a second embodiment of my soaker device along the line 3—3 in Fig. 4;

Fig. 4 is a fragmentary plan view of the embodiment of Fig. 3;

Fig. 5 is a transverse cross sectional view of a third embodiment of my soaker device along the line 5—5 in Fig. 6;

Fig. 6 is a fragmentary plan view of the embodiment of Fig. 5; and

Fig. 7 is a perspective view of the first embodiment, illustrated in Figs. 1 and 2 of my soaker device, showing how the liquid trickles down to and soaks the contiguous underlying ground.

Reference is now made to the drawings for a more complete understanding of my soil soaking device.

The first embodiment of my device, shown in Figs. 1 and 2, and designated by the numeral 2, comprises a pair of spaced, hose elements 3, which may be crescent-shaped in cross section and curved toward each other. The hose elements may be made of any firm, flexible material, such as a resinous plastic, whereby the device may be bent and twisted without kinking or creasing. The hose elements 3 have inner, confronting wall portions 4, which are interconnected by a web 6 which may be made of the same material as the hose elements 3. The wall portions 4 have holes 5 directed inwardly toward the inner portions of the soaker device, and the web 6 has a row of transverse holes 7 therethrough.

Thus, liquid, under pressure, will project streams through the holes 5 in the wall portions 4, out of the hose elements, which will impinge against the web 6, and/or the confronting wall portion 4, and the force of such streams will thereby be checked. The liquid below the web 6, will impinge against the lower confronting wall portions 4 and will trickle down to the underlying soil and the liquid above the web 6 will trickle down through the holes 7. The openings 4 on one wall portion 5 may be staggered in relation to the openings in the confronting wall portion 4 to preclude the streams from splashing and spraying the liquid beyond the soil area desired.

The second embodiment of my soaker device, designated 9 in Figs. 3 and 4, comprises two adjacent hose elements 10 bonded together conventionally as by heat and pressure which may be crescent-shaped in cross section and have longitudinal fins 11 extending outwardly from the tips of the crescents. The fins initially straight are heat sealed at intervals to provide abutting portions 12, and separated portions 13, the latter forming openings 14 to allow liquid between the hose elements 10 to escape therefrom. The inner confronting wall portions 15 have staggered holes 16 therein to direct streams of liquid under pressure from the hose elements 10 onto the confronting wall portions 15, where the pressure is checked, the liquid thereafter trickling down over the confronting surfaces of the wall portions 15, through the lower openings 14, and running onto the underlying soil.

The third embodiment of my soaker device, designated 18 in Figs. 5 and 6, is like the embodiment of Figs. 3 and 4, in that it has hose elements 10, crescent-shaped in cross section, having inner confronting wall portions 15 having staggered holes therein, and outer wall portions 17. In this embodiment, the fin structure extending outwardly from the tips of the crescents, however, is modified. As shown in Fig. 6, one longitudinal fin 19 extends along a straight line and the adjacent fin is corrugated, having straight abutting portions 20, and inwardly curved portions 21, to provide with the fin 19, openings 22 to allow liquid within the device, between the wall portions 15, to trickle out of the lower openings 22 to the underlying soil.

The second and third embodiment, Figs. 3, 4, and Figs. 5, 6, respectively, may be made of the same flexible, plastic material, as the first embodiment, Figs. 1, 2, or of any other suitable material.

Although certain exemplary embodiments have been disclosed, it will be understood that various changes, modifications and substitutions may be made, without depart-

I claim:

1. A tubular soaker device for moistening soil comprising wall means adapted to convey liquid under pressure, said wall means having spaced confronting portions, at least one of said confronting portions having through openings directed toward the other confronting portion, said device provided with additional through openings directed radially between said confronting portions, whereby streams of liquid under pressure issuing from said first-named openings will be checked by said confronting wall portions and the liquid will then ooze out of said second-named openings and descend gently onto the soil.

2. A soaker device for moistening soil comprising, adjacent interconnected members adapted to convey liquid under pressure, confronting portions of said members being spaced from each other, each confronting portion having a set of openings directed inwardly of the device toward the other portion, said device provided with additional through openings directed radially between said confronting portions, whereby streams of liquid in said members may issue through openings in each of said confronting portions outside of said portions, be checked by other portions of the device and ooze out of said device onto the soil.

3. A soaker device for moistening soil comprising, adjacent interconnected members adapted to convey liquid under pressure, confronting portions of said members being spaced from each other, each confronting portion having a set of openings directed inwardly of the device toward the other portion, the openings of one set being staggered with respect to the openings of the other set, said device provided with additional through openings directed radially between said confronting portions, whereby streams of liquid in said members may issue through openings in each of said confronting portions outside of said portions, be checked by other portions of the device and ooze out of said device onto the soil.

4. A soaker device for moistening soil comprising, adjacent interconnected, elongated, flexible, members adapted to convey liquid under pressure, confronting portions of said members being spaced from each other, each confronting portion having a set of openings directed inwardly of the device toward the other portion, said device provided with additional through openings directed radially between said confronting portions, whereby streams of liquid in said members may issue through openings in each of said confronting portions outside of said portions, be checked by other portions of the device and ooze out of said device onto the soil.

5. A soaker device for moistening soil comprising, adjacent interconnected, elongated, flexible, tubular members adapted to convey liquid under pressure, confronting portions of said members being spaced from each other, each confronting portion having a set of openings directed inwardly of the device toward the other portion, said device provided with additional through openings directed radially between said confronting portions, whereby streams of liquid in said members may issue through openings in each of said confronting portions outside of said portions, be checked by other portions of the device and ooze out of said device onto the soil.

6. A soaker device for moistening soil comprising, adjacent, spaced, elongated, flexible, tubular members adapted to convey liquid under pressure, a web member interconnecting said tubular members, each confronting wall portion of said tubular members having a set of openings directed inwardly of the device toward the other portion, said web member having transverse openings therein, whereby streams of liquid issuing through said sets of openings outside of said confronting wall portions will be checked by other portions of said device, and will ooze out of said device onto the soil.

7. A soaker device for moistening soil comprising, adjacent, elongated, flexible, tubular crescent-shaped members curved toward each other adapted to convey liquid under pressure, a web member interconnecting said tubular members, each confronting wall portion of said tubular members having a set of openings directed inwardly of the device, the openings of each set being staggered in relation to the other set, said web member having transverse openings therein, whereby streams of liquid issuing through said sets of openings outside of said confronting wall portions will be checked by other portions of said device, and will ooze out of said device onto the soil.

8. A soaker device for moistening the soil comprising, adjacent, interconnected, elongated, flexible, tubular members, said members adapted to convey liquid under pressure, inner confronting spaced wall portions of said tubular members having sets of openings directed inwardly of the device toward the other portion with the openings of each set staggered with relation to the openings of the other set, said members having elongated fins extending radially outwardly therefrom, said fins having portions abutting and connected to each other at spaced longitudinal intervals and other portions spread apart between said abutting portions to provide spaced, longitudinal openings directed radially between said confronting portions, whereby streams of liquid issuing through said sets of openings outside of each of said confronting wall portions will be checked by the other confronting wall portion and will ooze out of said device onto the soil.

9. A soaker device comprising, adjacent, interconnected, elongated, flexible, tubular members, said members adapted to convey liquid under pressure, inner confronting spaced wall portions of said tubular members having sets of openings directed inwardly of the device toward the other portion with the openings of each set staggered with relation to the openings of the other set, said members having longitudinal fins extending radially outwardly therefrom, said fins having portions abutting and connected to each other at spaced longitudinal intervals, the fins of each member having portions offset inwardly between said abutting portions to provide spaced longitudinal openings directed radially between said confronting portions, whereby streams of liquid issuing through said sets of openings outside of each of said confronting portions will be checked by the other confronting wall portion and will ooze out of said device onto the soil.

10. A soaker device comprising, adjacent, interconnected, elongated, flexible, tubular members, said members adapted to convey liquid under pressure, inner confronting spaced wall portions of said tubular members having sets of openings directed inwardly of the device toward the other portion with the openings of each set staggered with relation to the openings of the other set, said members having longitudinal fins extending radially outwardly therefrom, providing pairs of adjacent fins on opposite sides of said device, one fin of each pair being straight throughout its length, the other fin of each pair having straight portions abutting and connected to said one straight fin, said straight portions being interconnected by inwardly curved portions to provide with said one straight fin, spaced longitudinal openings directed radially between said confronting wall portions, whereby streams of liquid issuing through said sets of openings outside of each of said confronting wall portions will be checked by the other confronting wall portion and will ooze out of said device onto the soil.

References Cited in the file of this patent

UNITED STATES PATENTS

| | | |
|---|---|---|
| 2,621,075 | Sedar | Dec. 9, 1952 |
| 2,749,180 | Andrews | June 5, 1956 |
| 2,814,529 | Arnt | Nov. 26, 1957 |